No. 681,189. Patented Aug. 27, 1901.
J. P. BROPHY.
SPEED CHANGING DEVICE FOR AUTOMATIC LATHES.
(Application filed Oct. 11, 1900.)
(No Model.) 2 Sheets—Sheet 2.
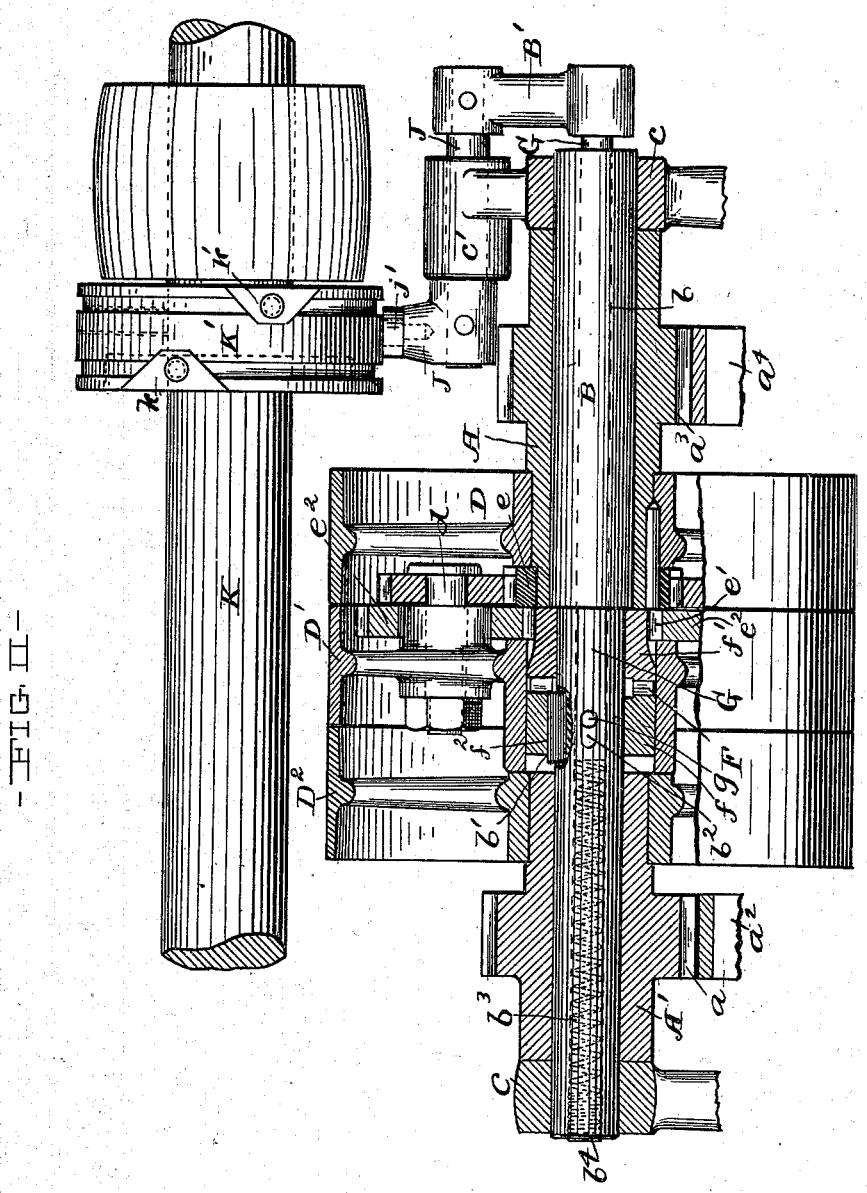
FIG. II.

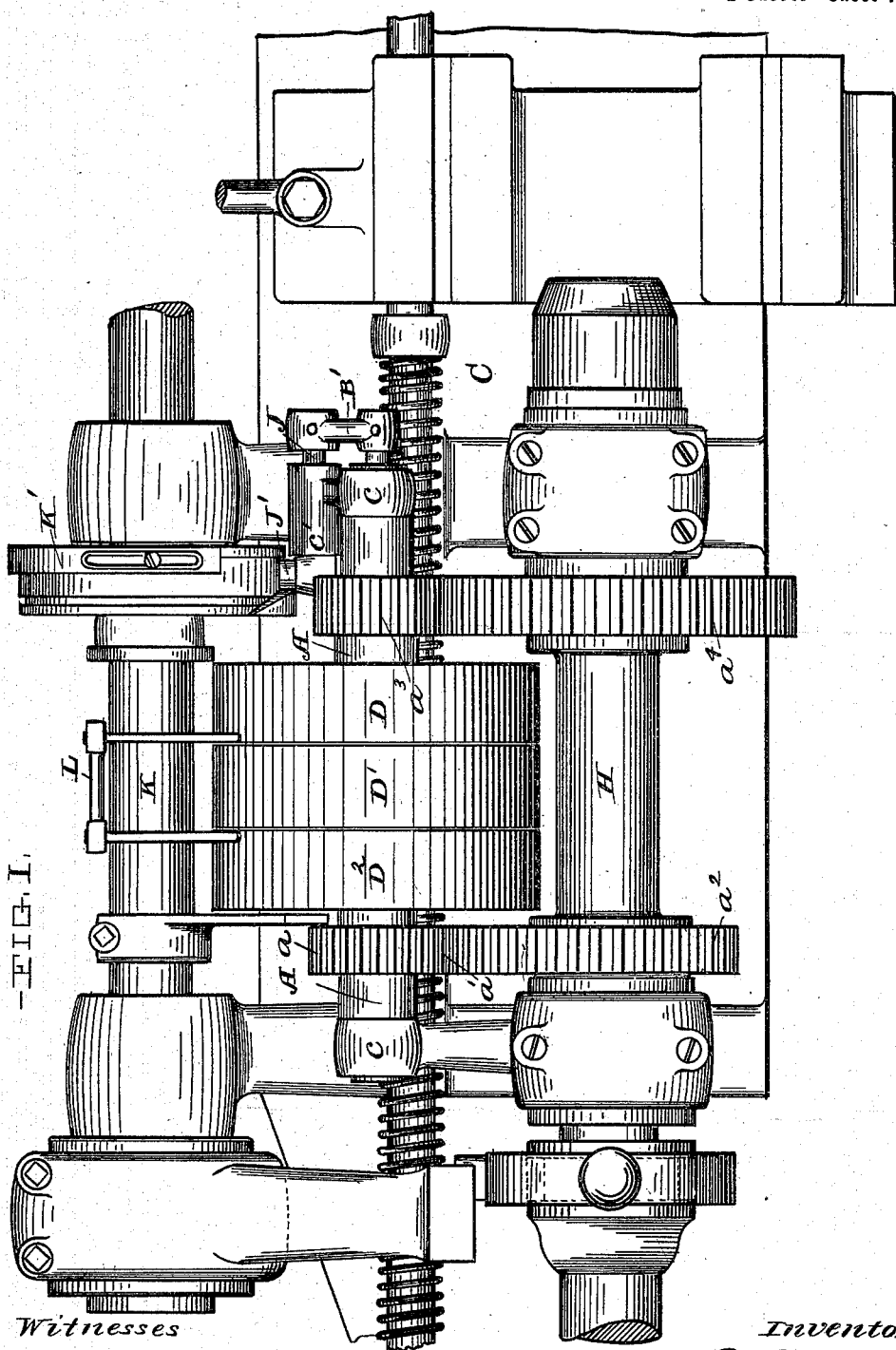

UNITED STATES PATENT OFFICE.

JOHN P. BROPHY, OF CLEVELAND, OHIO, ASSIGNOR TO THE CLEVELAND MACHINE SCREW COMPANY, OF SAME PLACE.

SPEED-CHANGING DEVICE FOR AUTOMATIC LATHES.

SPECIFICATION forming part of Letters Patent No. 681,189, dated August 27, 1901.

Application filed October 11, 1900. Serial No. 32,691. (No model.)

*To all whom it may concern:*

Be it known that I, JOHN P. BROPHY, a citizen of the United States, and a resident of Cleveland, county of Cuyahoga, and State of Ohio, have invented a new and useful Improvement in Speed-Changing Devices for Automatic Lathes, of which the following is a specification, the principle of the invention being herein explained and the best mode in which I have contemplated applying that principle, so as to distinguish it from other inventions.

My invention relates to automatic lathes, and particularly to devices for changing the speed and direction of rotation of the live-spindle, whereby the speed of the work and the direction of rotation thereof may be changed to conform with the nature of the operation being performed thereon.

The annexed drawings and the following description set forth in detail certain means embodying the invention, such disclosed means constituting but one of various forms in which the principle of the invention may be used.

In said annexed drawings, Figure I represents a top plan view of the head-stock and adjacent parts of an automatic lathe embodying my invention. Fig. II represents an enlarged detail plan view with part of the adjacent mechanism shown in Fig. I omitted and a part of the invention illustrated in horizontal cross-section.

A hollow driving-spindle A is mounted upon a rod B, suitably supported in brackets $c$, secured to or a part of the frame C of the lathe, said rod being provided with a bore $b$. (Indicated by dotted lines, Fig. II.) Upon the inner end of said spindle A is coaxially secured a driving-pulley D, upon the inner end of whose hub is rotatively secured a pinion $e$, forming one member of a train of differential gearing forming a speed-reducing device and hereinafter more fully described, the particular form of such gearing being, however, well known.

That part of the rod B adjacent to the portion journaling the driving-spindle is of reduced diameter, as shown in Fig. II, and upon such part is mounted a clutch F, consisting of two members $f$ and $f'$, the one, $f$, being rotatively fixed to and the other, $f'$, being loose and rotatable upon said rod, as will further appear. Secured to or formed upon the rotatable clutch member $f'$ is a second pinion $e'$, forming a part of the differential gearing above mentioned. Journaled upon the outer cylindrical surfaces of said clutch members is a second driving-pulley D', coaxial with spindle A, said pulley being provided with two studs $d$, upon each of which is journaled a double pinion $e^2$, having two diameters, as is shown in Fig. II, the portion of said pinion of larger diameter meshing with the pinion $e'$ and the portion of smaller diameter meshing with the pinion $e$. The two pulleys D and D' are therefore connected with each other through the medium of differential gearing consisting of the pinions $e$, $e'$, and $e^2$. Pulley D being secured upon the spindle A and pulley D' being loosely rotatable upon the clutch, it is seen that when the two clutch members are disconnected pulley D may be caused to drive the spindle, pulley D' at such time being an idler. The two clutch members when engaged permit the pulley D' to be the driver, driving the pulley D and its attached spindle through the medium of the differential gearing, and thereby forming a speed-reducing means, the speeds produced by the two pulleys being comparatively fast and slow.

Clutch member $f$ is provided with a keyway $f^2$, in which slides a key $b'$, secured to the rod B, as is shown in Fig. II. Said rod is provided with an elongated opening $b^2$, through which extends a pin $g$, secured to a shifting rod G, located in the bore $b$ of the rod B, as is shown in Fig. II. The inner end of said shifting rod is engaged by a helical spring $b^3$, located in the bore of the rod B and confined therein by means of a screw-plug $b^4$, thereby tending to maintain the shifting rod G and clutch member $f$ in the position shown in Fig. II, such position being that in which the two clutch members engage each other, as shown.

Adjacent to pulley D' and secured to a second hollow spindle A', supported upon rod B, is a third pulley $D^2$, rotatively independent of the adjacent pulleys D and D'. Upon said hollow spindle A' is secured or formed a pinion $a$, which meshes with a second pinion $a'$, the latter meshing with a third pinion $a^2$, secured to the live-spindle H, as shown in Fig. I. Secured to or formed upon the driving-spindle A is a pinion $a^3$, meshing with a gear $a^4$, secured to said live-spindle H, as shown in said figure.

The end of the shifting rod G opposite that engaged by the helical spring $b^3$ projects beyond the end of the rod B, as shown in Fig. II, such end being secured to a link B', whose opposite end is secured to a slidable rod J, mounted in a suitable bracket $c'$. Upon the end of said slidable rod J is secured a support $j$ for a roller $j'$, having its axis of rotation transverse with respect to the axis of rotation of the driving-spindles.

Mounted upon a shaft K, having its axis of rotation parallel with that of the driving-spindles, is a cam-drum K', provided with two cams $k$ and $k'$, adapted to engage roller $j'$ and move the shifting rod G inwardly or outwardly, according to its position, as will further appear.

A suitable belt-shifter L is located in the vicinity of the driving-pulleys, as shown in Fig. I, and is connected with the lathe mechanism in a manner and is of a construction such that the belt may be shifted from pulley D to pulley D', thence to pulley $D^2$, and then returned to pulley D. Such belt-shifter may be of any desired construction, but is preferably of the construction shown and described in Letters Patent No. 554,813, dated February 18, 1896.

In operating the above-described device the belt is first placed upon the pulley D, the clutch members being so placed as to be disengaged one from the other, whereby the pulley D' is rendered idle. The speed so acquired by the live-spindle H is comparatively high and may be utilized in operations upon the work secured to the live-spindle, such as a light superficial trimming cut. When such operation is completed and it is desired to impart a comparatively slow speed to the work, the cam-drum is so timed as to cause the cam $k$ to engage the roller $j'$, shift the position of the shifting rod G, and thereby effect the engagement of the two clutch members, the belt-shifter being so timed as to shift the belt upon the pulley D' simultaneously with the action of the cam-drum described. The clutch member $f'$ thereby becomes rotatively fixed to the rod B and effects the operation of the differential gearing, transmitting the motion of pulley D' to pulley D, and thereby imparting a comparatively slow speed to the live-spindle through the medium of the connecting gearing. The operation requiring the slow speed now being completed, the belt-shifter is actuated so as to throw the belt upon the pulley $D^2$, thereby reversing the movement of the live-spindle, as is required in the operation of cutting threads upon the work when it is desired to remove the dies from the threads upon completion of the thread-cutting operation, the speed so acquired being a comparatively high one. Simultaneously with the shifting of the belt upon pulley $D^2$ the shifting rod G is actuated by the cam $k'$, so as to disengage the two clutch members, thereby permitting pulley D' to become idle and the pulley D to be driven by the live-spindle.

The particular arrangement above described is especially adapted for use in cutting threads upon a blank, in which a light cut is first taken, so as to trim or finish the surface of the blank, the dies then applied, the thread cut, and the dies then withdrawn, the blank having its direction of rotation simultaneously reversed. The trimming or finishing operation permitting a much higher speed on the part of the blank than is permitted in the thread-cutting operation, it is seen that the capacity of the machine is increased over that which it has when the speed of rotation of the live-spindle is uniform, such speed being necessarily that required in the thread-cutting operation and much slower than may be used for the trimming cut.

The spring $b^3$ is utilized for counteracting the tendency of the rods G and J to jam or cramp when being shifted by cam $k$, so as to cause the clutch members to engage, and is made of a size and degree of elasticity insufficient for shifting the parts by its own force only.

Other modes of applying the principle of my invention may be employed instead of the one explained, change being made as regards the means herein disclosed, provided the means covered by any one of the following claims be employed.

I therefore particularly point out and distinctly claim as my invention—

1. In an automatic lathe, a head-stock speed-changing device comprising in its construction the combination of a driving-spindle, driving-pulleys mounted so as to be coaxial with said spindle, two of such pulleys provided with connecting differential gearing, clutch mechanism, one member of such gearing being connected with one member of said clutch mechanism, and means for throwing said clutch member into and out of engagement with the other whereby said differential gearing may be rendered operative or inoperative.

2. In an automatic lathe, a head-stock speed-changing device comprising in its construction, the combination of a hollow spindle, two clutch members mounted upon said spindle, one of which is rotatively fixed and the other of which when disengaged from the first, is capable of rotation on said spindle, two pulleys mounted upon the latter and connected with each other through the medium of differential gearing, one element of such gearing being secured to said rotatable clutch member, and means for connecting and disconnecting said clutch members, one pulley being fixed to and the other rotatable upon said spindle.

3. In an automatic lathe, a speed-changing device comprising in its construction a hollow driving-spindle, two clutch members mounted upon said spindle one of which is rotatively fixed but longitudinally movable and the other of which when disengaged from the first, is capable of rotation on said spindle, two pulleys mounted upon the latter and connected with each other through the medium of differential gearing, one element of such gearing being secured to said rotatable clutch member, a shifting rod in said spindle connected with said rotatively-fixed clutch member, and a rotatable cam-drum for engaging said rod, whereby the latter may be actuated to cause said clutch members to engage or disengage and the differential gearing rendered operative or inoperative.

4. In an automatic lathe, the combination of a live-spindle, a driving-spindle, three pulleys mounted upon the latter, two of such pulleys connected with each other through the medium of speed-reducing means, and clutch mechanism for rendering such speed-reducing means operative or inoperative whereby one of such pulleys may be caused to drive said spindle direct or the other caused to drive the first through the medium of such gearing, such driving-spindle connected with said live-spindle by gearing, the third pulley being independent of the remaining two pulleys and connected with the said spindle by gearing.

5. In an automatic lathe, the combination of a live-spindle, a driving-spindle, three pulleys mounted upon the latter, a belt and driving means for driving said three pulleys in the same direction, two of the latter connected with each other through the medium of speed-reducing means, and clutch mechanism for rendering such speed-reducing means operative or inoperative whereby one of such pulleys may be caused to drive said spindle direct or the other caused to drive the first through the medium of such gearing, such driving-spindle being connected with said live-spindle by gearing, the third pulley being independent of the remaining two and connected with said live-spindle by gearing having a number of elements such as to produce a rotation of said live-spindle opposite that produced by said remaining two pulleys.

Signed by me this 9th day of October, 1900.

J. P. BROPHY.

Attest:
GEO. WM. SAYWELL,
A. E. MERKEL.